United States Patent
Shin

(10) Patent No.: US 11,035,504 B2
(45) Date of Patent: Jun. 15, 2021

(54) CONNECTION STRUCTURE OF METAL CORRUGATED PIPE

(71) Applicant: DooBon Flexible Co., LTD, Gimpo-si (KR)

(72) Inventor: Hwa-ok Shin, Goyang-si (KR)

(73) Assignee: DooBon Flexible Co., LTD, Gimpo-si (KR)

( * ) Notice: Subject to any disclaimer, the term of this patent is extended or adjusted under 35 U.S.C. 154(b) by 280 days.

(21) Appl. No.: 16/138,818

(22) Filed: Sep. 21, 2018

(65) Prior Publication Data

US 2019/0128450 A1  May 2, 2019

(30) Foreign Application Priority Data

Oct. 30, 2017  (KR) .................. 10-2017-0142769

(51) Int. Cl.
| | | |
|---|---|---|
| *F16L 19/00* | (2006.01) | |
| *F16L 33/26* | (2006.01) | |
| *F16L 25/00* | (2006.01) | |

(52) U.S. Cl.
CPC ........... *F16L 19/00* (2013.01); *F16L 25/0054* (2013.01); *F16L 33/26* (2013.01)

(58) Field of Classification Search
CPC ....... F16L 19/06; F16L 19/061; F16L 19/065; F16L 19/10; F16L 19/12; F16L 19/14; F16L 25/0036; F16L 25/0054
USPC .................................. 285/343, 354, 386, 903
See application file for complete search history.

(56) References Cited

U.S. PATENT DOCUMENTS

| | | | | |
|---|---|---|---|---|
| 2,172,532 | A * | 9/1939 | Fentress ............... | F16L 33/2073 285/256 |
| 5,267,877 | A * | 12/1993 | Scannelli ............. | H01R 9/0521 439/584 |
| 5,845,946 | A * | 12/1998 | Thomas ............... | F16L 25/0036 285/348 |
| 6,102,445 | A * | 8/2000 | Thomas ............... | F16L 25/0036 285/139.1 |
| 6,237,969 | B1 * | 5/2001 | Amatsutsu .......... | F16L 25/0036 285/357 |
| 6,431,610 | B1 * | 8/2002 | Ohirano ................ | E03C 1/0403 137/15.09 |

(Continued)

FOREIGN PATENT DOCUMENTS

| | | |
|---|---|---|
| KR | 10-0668706 B1 | 1/2007 |
| KR | 20-2014-0002179 U | 4/2014 |

*Primary Examiner* — Aaron M Dunwoody
(74) *Attorney, Agent, or Firm* — Heedong Chae; Lucem, PC

(57) ABSTRACT

The present invention relates to a connection structure of a metal corrugated pipe, which is used to connect metal corrugated pipes with each other or to connect a metal corrugated pipe to a boiler combustor. The connection structure includes a first connection member having one side, in which an external thread is formed on an outer surface of the one side and an inner surface of the one side has a diameter gradually reduced to form an inclined surface; a second connection member formed on an inner surface thereof with an internal thread screw-coupled with the external thread; and a heat-resistant packing fitted on the outer surface of the metal corrugated pipe, in which a front end of the heat-resistant packing is compressed by the inclined surface as the first connection member is screw-coupled with the second connection member.

3 Claims, 4 Drawing Sheets

(56) References Cited

U.S. PATENT DOCUMENTS

| | | | | |
|---|---|---|---|---|
| 6,435,567 B2* | 8/2002 | Kikumori | ............ | F16L 25/0036 285/319 |
| 9,127,790 B2* | 9/2015 | Oh | ......................... | F16L 19/061 |
| 2002/0079702 A1* | 6/2002 | Baumann | ................ | F16L 33/26 285/343 |
| 2004/0155463 A1* | 8/2004 | Moner | ................ | F16L 25/0036 285/322 |
| 2010/0176587 A1* | 7/2010 | Oh | ..................... | F16L 25/0045 285/148.21 |

* cited by examiner

CONNECTION STRUCTURE OF METAL CORRUGATED PIPE

CROSS-REFERENCE TO RELATED APPLICATION

This application claims the benefit of Korean application No. 10-2017-0142769, filed on Oct. 30, 2017, the disclosure of which is incorporated herein by reference.

BACKGROUND

1. Field

The present invention relates to a connection structure of a metal corrugated pipe, which is used to connect metal corrugated pipes with each other or to connect a metal corrugated pipe to a boiler combustor or the like and in which ends of a metal packing and the metal corrugated pipe are compressed by the force of mutual engagement of screw type connection members used for connecting the metal corrugated pipes so that the end of the metal packing strongly adheres to an inner surface of the connection member and an outer surface of the metal corrugated pipe, thereby perfectly preventing leakage of fluid such as gas at a corresponding connection portion.

2. Description of the Related Art

In general, a corrugated pipe is configured as a corrugated shape in which mountains and valleys are continuously formed in the longitudinal direction, and the corrugated pipe is easily bent in a predetermined shape so that the corrugated pipe is used for various purposes.

For example, a metal corrugated pipe is widely used as a gas supply pipe for boilers, ovens, dryers, heaters, etc., which use gas as fuel. Since the metal corrugated pipe is connected to a constitution of discharging heat such as a combustor of a boiler, the metal corrugated pipe is generally made of stainless steel having excellent heat resistance that can withstand the high temperature.

The connection between the metal corrugated pipes and the connection of the metal corrugated pipe to the boiler combustor and the like is usually carried out through male and female joint members using a screw coupling method and a rubber packing.

However, since the metal corrugated pipe is generally used for transferring a high-temperature fluid such as high-temperature gas, the rubber packing having the airtightness function may be melted so that the airtight function may be easily lowered or lost.

For this reason, a flare joint method is widely used to connect the metal corrugated pipe while maintaining airtightness without providing a packing member.

The flare joint method refers to a coupling scheme in which one end in the longitudinal direction of the metal corrugated pipe is formed into a bell shape or a trumpet shape.

However, when the metal corrugated pipes are connected to each other by using the flare joint method, a small amount of gas leakage occurs at a connection portion between the metal corrugated pipes. In other words, when the metal corrugated pipes are connected to each other through the flare joint method, the gas leakage at the corresponding connection portion is not completely blocked.

In addition, the flare joint method uses a machine to produce a precise trumpet shape, but it is impossible to process the precise trumpet shape at the piping work site. Although a tool can be used for the flare joint method at the piping work site, the degree of precision may be lowered so that the gas leakage blocking performance may be often lowered.

Accordingly, there is a need for a connection structure or a connection method that can maintain the airtightness even after a long time elapses, and at the same time, can completely prevent the gas leakage at the connection portion between the metal corrugated pipes and the connection portion between the metal corrugated pipe and the boiler combustor.

RELATED ART DOCUMENTS

Patent Documents (Patent Document 1) Korean Unexamined Utility Model Publication No. 20-2014-0002179 (published on Apr. 17, 2014) entitled "Gas pipe connection structure for preventing gas leakage combined with bending cap"

(Patent Document 2) Korean Registered Patent No. 10-0668706 (issued on Jan. 15, 2007), entitled "Connecting method and connection member using flexible metallic gas tube"

SUMMARY

An embodiment of the present invention provides a connection structure of a metal corrugated pipe, which is used to connect metal corrugated pipes with each other or to connect a metal corrugated pipe to a boiler combustor or the like and in which ends of a metal packing and the metal corrugated pipe are compressed by the force of mutual engagement of screw type connection members used for connecting the metal corrugated pipes so that the end of the metal packing strongly adheres to an inner surface of the connection member and an outer surface of the metal corrugated pipe, thereby perfectly preventing leakage of fluid such as gas at a corresponding connection portion.

A connection structure of a metal corrugated pipe according to an embodiment of the present invention includes: a first connection member having one side into which the metal corrugated pipe is inserted, in which an external thread is formed on an outer surface of the one side of the first connection member and an inner surface of the one side of the first connection member has a diameter gradually reduced in an insertion direction of the metal corrugated pipe to form an inclined surface; a second connection member fitted on an outer surface of the metal corrugated pipe and formed on an inner surface thereof with an internal thread screw-coupled with the external thread; and a heat-resistant packing fitted on the outer surface of the metal corrugated pipe, in which a front end of the heat-resistant packing directed to the first connection member is compressed by the inclined surface as the first connection member is screw-coupled with the second connection member so that the front end of the heat-resistant packing is bent and adheres to the inclined surface, wherein one end of the metal corrugated pipe inserted into the first connection member is compressed by the inclined surface as the first connection member is screw-coupled with the second connection member so that the one end of the metal corrugated pipe adheres to an inner surface of the heat-resistant packing.

The heat-resistant packing may have a tubular ring shape and may be formed of a metal material.

A resilient packing may be fitted on a valley of the metal corrugated pipe facing the inner surface of the heat-resistant packing.

An anti-separation ring may be fitted on valleys formed on one end or both ends of the metal corrugated pipe in a longitudinal direction for preventing the second connection member from being separated.

According to an embodiment of the present invention, the connection portion between the metal corrugated pipes or the connection portion of the metal corrugated pipe with respect to the boiler combustor and the like is maintained in a completely airtightness state, and thus the leakage of the fluid such as gas is completely prevented at the connection portion and the connection work can be carried out without any additional machining at the piping work site of the metal corrugated pipe.

DETAILED DESCRIPTION

Figure 1:
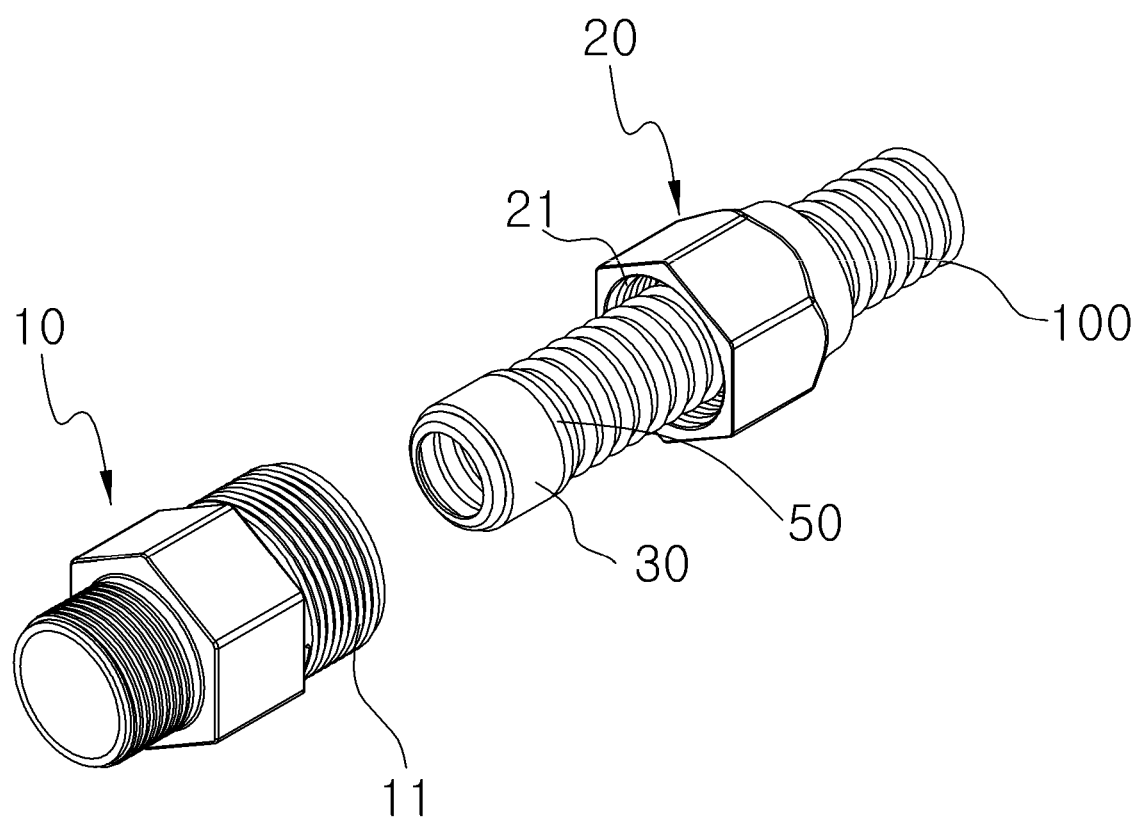
FIG. 1 is a perspective view illustrating a connection structure of a metal corrugated pipe according to an embodiment of the present invention.

Reference will now be made in detail to the embodiments of the present invention, examples of which are illustrated in the accompanying drawings. These embodiments are described in sufficient detail to enable those skilled in the art to practice the invention. It should be understood that the various embodiments of the present invention are different, but need not be mutually exclusive. For example, certain features, structures, and characteristics described herein may be implemented in other embodiments without departing from the spirit and scope of the invention in connection with an embodiment. It is also to be understood that the position or arrangement of the individual components within each described embodiment may be varied without departing from the spirit and scope of the present invention.

Therefore, the following detailed description is not to be taken in a limiting sense, and the scope of the present invention is to be defined only by the appended claims and includes the scope of equivalents of the claimed invention. In the drawings, like reference numerals refer to the same or similar functions throughout various aspects.

With respect to the terms used in the present invention, general terms that are currently and widely used are selected in consideration of functions of the present invention. However, the meanings of the terms may be changed according to intention of those skilled in the art, a judicial precedent, emergence of a new technology, and the like. In addition, in certain cases, a term may be selected at discretion of the applicant. In such cases, the meaning of the term will be described in detail at the corresponding part in the description of the invention. Therefore, the terms used in the present invention should be defined based on the meanings of the terms and the entire descriptions provided herein without being simply limited to the names of terms.

Throughout the description of the present invention, when some part "includes" some elements, unless explicitly described to the contrary, it means that other elements may be further included but not excluded.

A connection structure of a metal corrugated pipe according to an embodiment of the present invention will be described with reference to FIGS. 1 to 4.

Figure 2:
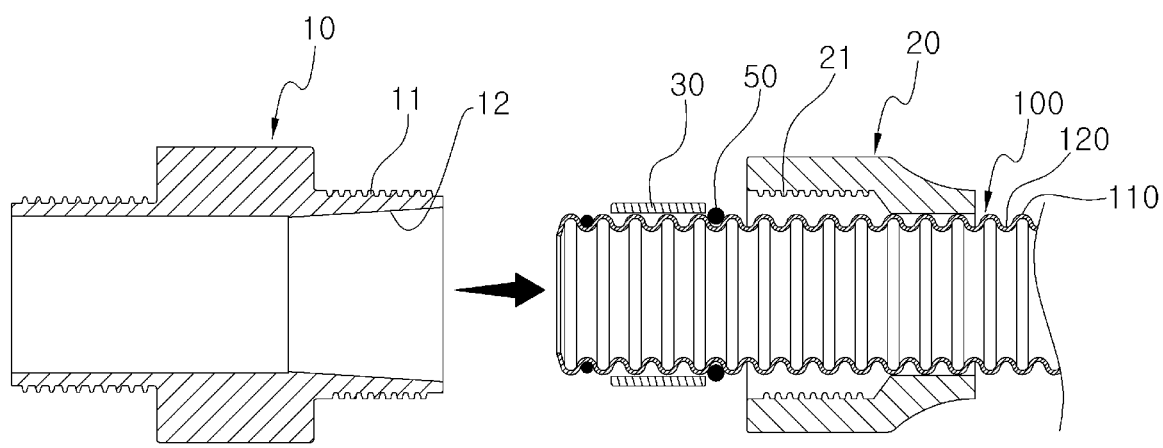
FIG. 2 is a sectional view of FIG. 1.
Figure 3:
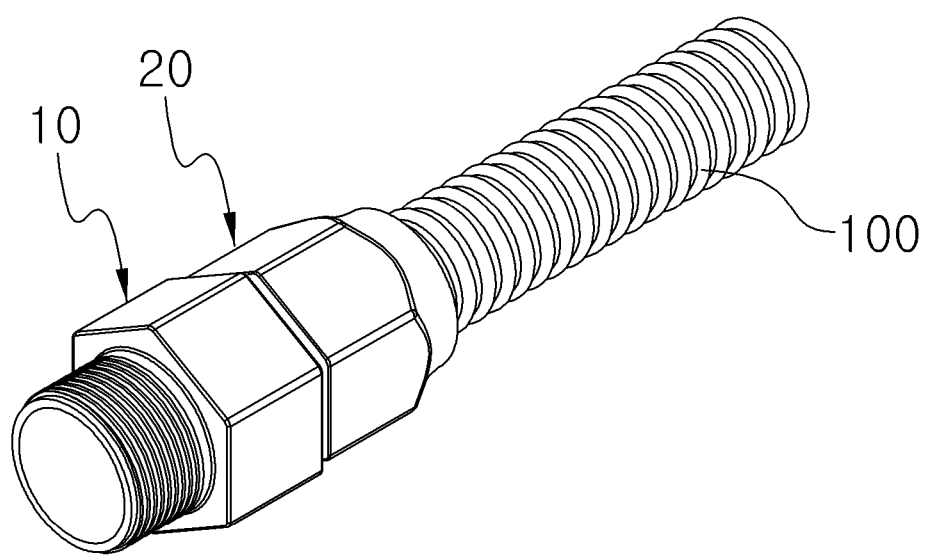
FIG. 3 is an assembled perspective view of the connection structure of the metal corrugated pipe according to the embodiment of the present invention.
Figure 4:
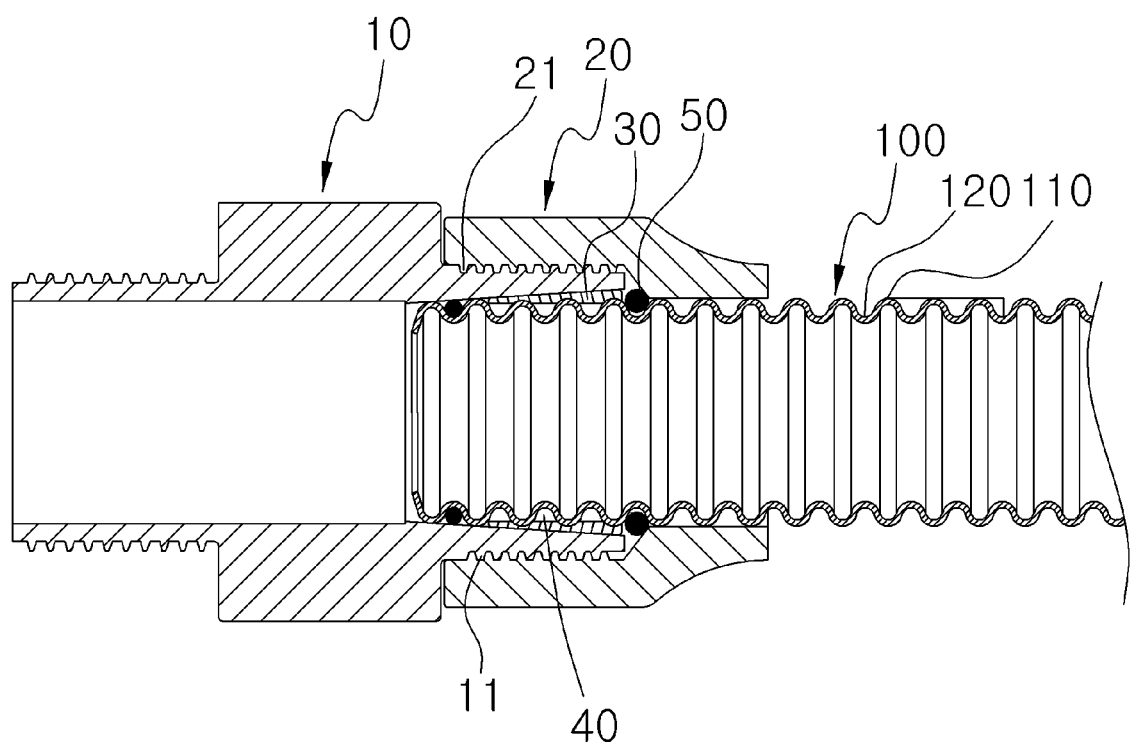
FIG. 4 is a sectional view of FIG. 3.

FIG. 1 is a perspective view illustrating a connection structure of a metal corrugated pipe according to an embodiment of the present invention, FIG. 2 is a sectional view of FIG. 1, FIG. 3 is an assembled perspective view of the connection structure of the metal corrugated pipe according to the embodiment of the present invention, and FIG. 4 is a sectional view of FIG. 3.

As shown in the drawings, the connection structure of the metal corrugated pipe according to the embodiment of the present invention includes a first connection member 10, a second connection member 20, and a heat-resistant packing 30. In addition, the connection structure of the metal corrugated pipe according to the embodiment of the present invention may further include an elastic packing 40 and an anti-separation ring 50.

The first connection member 10 has one side into which the metal corrugated pipe 100 is inserted, and an external thread 11 is formed on an outer surface of the one side of the first connection member 10. An inner surface of the one side of the first connection member 10 where the external thread 11 is formed has a diameter gradually reduced in the insertion direction of the metal corrugated pipe 100 so that an inclined surface 12 is formed.

The second connection member 20 is fitted on an outer surface of the metal corrugated pipe 100 and an inner thread 21, which is screw-coupled with the external thread 11, is formed on an inner surface of the second connection member 20.

The heat-resistant packing 30 is fitted on an outer surface of the metal corrugated pipe 100 so that a front end of the heat-resistant packing 30 directed to the first connection member 10 is compressed and bent by the inclined surface 12 of the first connection member 10 as the first connection member 10 is screw-coupled with the second connection member 20 and adheres to the inclined surface of the first connection member 10.

In other words, the heat-resistant packing 30 is fitted on an outer surface of one longitudinal end of the metal corrugated pipe 100. As the second connection member 20 fitted on the outer surface of the corresponding metal corrugated pipe 100 is screw-coupled with the first connection member, the front end of the heat-resistant packing 30 directed to the first connection member 10 is compressed by the inclined surface 12 of the first connection member 10 so that the diameter of the front end of the heat-resistant packing 30 is reduced while strongly adhering to the inclined surface 12 of the first connection member 10.

Since the heat-resistant packing 30 strongly adheres to the inclined surface 12 of the first connection member 10, the airtightness between the inner surface of the first connection member 10 and the outer surface of the heat-resistant packing 30 can be securely kept so that the leakage of the fluid such as gas conveyed in the metal corrugated pipe 100 can be completely prevented.

In the present embodiment, the heat-resistant packing 30 has a tubular ring shape, and the tubular ring-shaped heat-resistant packing 30 is formed of a metal material, but the present invention is not limited thereto.

That is, the heat-resistant packing 30 may have various shapes and may be formed of various materials if it is satisfied that the heat-resistant packing 30 is fitted on the outer surface of one longitudinal end of the metal corrugated pipe 100 and, as the second connection member 20 fitted on the outer surface of the corresponding metal corrugated pipe 100 is screw-coupled with the first connection member, the front end of the heat-resistant packing 30 directed to the first connection member 10 is compressed by the inclined surface 12 of the first connection member 10 while strongly adhering to the inclined surface 12 of the first connection member 10.

In addition, one end of the metal corrugated pipe 100 inserted into the first connection member 10 is compressed by the inclined surface 12 of the first connection member 10 so that the one end of the metal corrugated pipe 100 adheres to the inner surface of the heat-resistant packing 30 as the first connection member 10 is screw-coupled with the second connection member 20. Since the inner surface of the heat-resistant packing 30 adheres to the outer surface of the metal corrugated pipe 100, the fluid such as gas conveyed through the metal corrugated pipe 100 is prevented from being leaked through a gap formed between the inner surface of the heat resistant packing 30 and the outer surface of the metal corrugated pipe 100, and even a slight leakage of the fluid can be prevented.

As described above, the airtightness between the inner surface of the first connection member 10 and the outer surface of the heat-resistant packing 30 can be securely kept to prevent even a slight leakage of the fluid, and at the same time, the airtightness between the inner surface of the heat-resistant packing 30 and the outer surface of the metal corrugated pipe 100 can be securely kept to prevent even a slight leakage of the fluid, so that connection portions of the metal corrugated pipe 100 with respect to the first connection member 10, the second connection member 20 and the heat heat-resistant packing 30 can be completely sealed.

In addition, an elastic packing 40 on valleys 120 of the metal corrugated pipe 100 such that the elastic packing 40 can be positioned at the front end of the heat-resistant packing 30. The elastic packing 40 may reinforce the airtightness function at the connection portions of the metal corrugated pipe 100 with respect to the first connection member 10, the second connection member 20 and the heat heat-resistant packing 30.

Further, an anti-separation ring 50 is fitted on the valleys 120 formed on one end or both ends of the metal corrugated pipe 100 in the longitudinal direction. The anti-separation ring 50 may prevent the second connection member 20 from being separated from the metal corrugated pipe 100 before the second connection member 20 is screw-coupled with the first connection member 10 or after the second connection member 20 is released from the first connection member 10. In the present embodiment, the anti-separation ring 50 is formed of a metal material, but the present invention is not limited thereto.

As can be understood from the above description with reference to FIGS. 1 to 4, the connection structure of the metal corrugated pipe according to the present invention can perfectly maintain the airtightness between the metal corrugated pipes or between the connection portion of the metal corrugated pipe and the boiler combustor, so that leakage of the fluid such as gas can be completely prevented at the corresponding connection portions.

Although the above description has been made with reference to illustrative embodiments and drawings as well as certain matters such as specific elements, the embodiments are provided for overall understanding of the present invention, and the present invention is not limited to the embodiments. It is understood by those skilled in the art that various changes and modifications can be made in these embodiments.

Therefore, the spirit of the present invention should not be construed as being limited to the embodiments described herein, and all variations within the scope of the appended claims and their equivalents are to be construed as being included in the scope of the present invention.

LIST OF REFERENCE NUMERALS

10: first connection member
11: external thread
12: inclined surface
20: second connection member
21: inner thread
30: heat-resistant packing
40: elastic packing
50: anti-separation ring
100: corrugated pipe
110: mountain
120: valley

What is claimed is:

1. A connection structure of a metal corrugated pipe, the connection structure comprising:
   a first connection member having one side into which the metal corrugated pipe is inserted, in which an external thread is formed on an outer surface of the one side of the first connection member and an inner surface of the one side of the first connection member has a diameter gradually reduced in an insertion direction of the metal corrugated pipe to form an inclined surface;
   a second connection member fitted on an outer surface of the metal corrugated pipe and formed on an inner surface thereof with an internal thread screw-coupled with the external thread; and
   a heat-resistant packing, having a ring shape, fitted on the outer surface of the metal corrugated pipe, in which a front end of the heat-resistant packing directed to the first connection member is compressed by the inclined surface as a force of mutual engagement of the first connection member is screw-coupled with the second connection member so that a diameter of the front end of the heat-resistant packing is reduced and the front end of the heat-resistant packing is bent and adheres to the inclined surface,
   wherein one end of the metal corrugated pipe inserted into the first connection member is compressed by the inclined surface as the first connection member is screw-coupled with the second connection member so that the one end of the metal corrugated pipe adheres to an inner surface of the heat-resistant packing,
   wherein the heat-resistant packing is formed of a metal material.

2. The connection structure of claim 1, wherein a resilient packing is fitted on a valley of the metal corrugated pipe facing the inner surface of the heat-resistant packing.

3. The connection structure of claim 1, wherein an anti-separation ring is fitted on valleys formed on one end or both ends of the metal corrugated pipe in a longitudinal direction for preventing the second connection member from being separated.

* * * * *